United States Patent
Raynor (10) Patent No.: US 12,282,612 B2
(45) Date of Patent: Apr. 22, 2025

(54) THREE-DIMENSIONAL INTERACTIVE DISPLAY

(71) Applicant: STMICROELECTRONICS (RESEARCH & DEVELOPMENT) LIMITED, Marlow (GB)

(72) Inventor: Jeff M. Raynor, Edinburgh (GB)

(73) Assignee: STMICROELECTRONICS (RESEARCH & DEVELOPMENT) LIMITED, Marlow (GB)

(*) Notice: Subject to any disclaimer, the term of this patent is extended or adjusted under 35 U.S.C. 154(b) by 0 days.

(21) Appl. No.: 18/362,724

(22) Filed: Jul. 31, 2023

(65) Prior Publication Data

US 2024/0045511 A1 Feb. 8, 2024

Related U.S. Application Data

(60) Provisional application No. 63/395,194, filed on Aug. 4, 2022.

(51) Int. Cl.
  *G06F 3/03* (2006.01)
  *G06F 3/01* (2006.01)
(52) U.S. Cl.
  CPC ............ *G06F 3/0308* (2013.01); *G06F 3/014* (2013.01)
(58) Field of Classification Search
  None
  See application file for complete search history.

(56) References Cited

U.S. PATENT DOCUMENTS

| | | |
|---|---|---|
| 7,397,504 B2 | 7/2008 | Cutler |
| 8,830,302 B2 | 9/2014 | Im et al. |
| 9,389,779 B2 | 7/2016 | Anderson et al. |
| 10,327,014 B2 | 6/2019 | Goldman et al. |
| 10,628,950 B2 | 4/2020 | Price et al. |
| 10,670,456 B2 | 6/2020 | Raynor et al. |
| 2016/0357261 A1* | 12/2016 | Bristol ............... G06F 1/1686 |

FOREIGN PATENT DOCUMENTS

WO   WO-2019018992 A1 *   1/2019   ............... G06F 3/01

OTHER PUBLICATIONS

Translation of WO-2019018992-A1 into English; Gu. (Year: 2019).*
Bachmann et al., "Review of Three-Dimensional Human-Computer Interaction with Focus 1 on the Leap Motion Controller," *Sensors* 18:2194, 2018. (39 pages).

* cited by examiner

*Primary Examiner* — Brian M Butcher (74) *Attorney, Agent, or Firm* — SEED IP LAW GROUP LLP (57) ABSTRACT

The present disclosure is directed to a three-dimensional interactive display system. The system detects a position of a user (e.g., the user's finger or hand) or an optical emitter device, along three different dimensions. In a case where the system detects a position of a user's finger, the user wears a passive device having angled surfaces on his or her finger to improve detection of the user's finger. In a case where the system detects the optical emitter device, the user holds the optical emitter device or wears the optical emitter device similar to the passive device. The optical emitter device emits light, and the system tracks the optical emitting device by detecting the light emitted by the optical emitter device.

21 Claims, 3 Drawing Sheets

THREE-DIMENSIONAL INTERACTIVE DISPLAY

BACKGROUND

Technical Field

The present disclosure is directed to an interactive display.

Description of the Related Art

Most user interactions with an electronic device, such as a computer, a mobile telephone, and a tablet, utilize two-dimensional input devices. For example, many electronic devices include a touch screen, keyboard, mouse, or a similar input device. Two-dimensional input devices are typically implemented with the use of physical objects that are relatively large and operated in a fixed position.

It is advantageous to provide additional user input capabilities for electronic devices for added flexibility. Three-dimensional input capabilities are particularly desirable as a user may use natural body movements to interact with the electronic device, and, thus, reduces overall effort from the user. User input capabilities that function in relatively small spaces; and implemented with small, lightweight input devices with low cost and energy consumption are also desirable.

BRIEF SUMMARY

The present disclosure is directed to a three-dimensional interactive display system. The system detects a position of a user (e.g., the user's finger or hand) or an optical emitter device, along three different dimensions. As a result, the user is able to interact with the system using natural body movements.

In a case where the system detects a position of a user's finger, the user wears a passive device on his or her finger, in order to improve detection of the user's finger. The passive device is cylindrical, and fits on to the user's finger similar to a thimble. The passive device includes a plurality of angled surfaces to reflect detection signals emitted by the system.

In a case where the system detects the optical emitter device, the user holds the optical emitter device or wears the optical emitter device similar to the passive device. The optical emitter device emits light, such as an infrared light signal; and the system tracks the optical emitting device by detecting the light emitted by the optical emitter device. The system alternates between a gesture mode and a ranging mode.

In the gesture mode, an emitter of a depth sensor included in the system is disabled and stops transmitting light signals. However, the emitter of the optical emitter device continues to emit light. The system determines an x-coordinate and a y-coordinate of the optical emitter device based on a position of the light with the largest light intensity on an image sensor of the system.

In the ranging mode, the emitter of the depth sensor is enabled, and both the emitter of the depth sensor and the emitter of the optical emitter device transmit light signals. The depth sensor determines a z-coordinate of the optical emitter device using, for example, time-of-flight techniques.

BRIEF DESCRIPTION OF THE SEVERAL VIEWS OF THE DRAWINGS

In the drawings, identical reference numbers identify similar features or elements. The size and relative positions of features in the drawings are not necessarily drawn to scale.

DETAILED DESCRIPTION

In the following description, certain specific details are set forth in order to provide a thorough understanding of various aspects of the disclosed subject matter. However, the disclosed subject matter may be practiced without these specific details. In some instances, well-known structures and methods of manufacturing and using interactive displays, electronic components, and sensors have not been described in detail to avoid obscuring the descriptions of other aspects of the present disclosure.

Unless the context requires otherwise, throughout the specification and claims that follow, the word "comprise" and variations thereof, such as "comprises" and "comprising," are to be construed in an open, inclusive sense, that is, as "including, but not limited to."

Reference throughout the specification to "one embodiment" or "an embodiment" means that a particular feature, structure, or characteristic described in connection with the embodiment is included in at least one embodiment. Thus, the appearance of the phrases "in one embodiment" or "in an embodiment" in various places throughout the specification are not necessarily all referring to the same aspect. Furthermore, the particular features, structures, or characteristics may be combined in any suitable manner in one or more aspects of the present disclosure.

As discussed above, it is advantageous to provide additional user input capabilities for electronic devices for added flexibility. The present disclosure is directed to a three-dimensional interactive display system. The system detects a position of a user (e.g., the user's finger or hand) and an optical emitter device, along three different dimensions. As a result, a user may interact with the system using natural body movements. Detection may be performed in cases where the space between a user and a display is relatively small, and where a user wears a display (e.g., heads-up display (HUD), electronic glasses, etc.). Further, detection is implemented with various sensors, emitters, switches, and processors that are small and lightweight, and have low cost and energy consumption.

Figure 1:
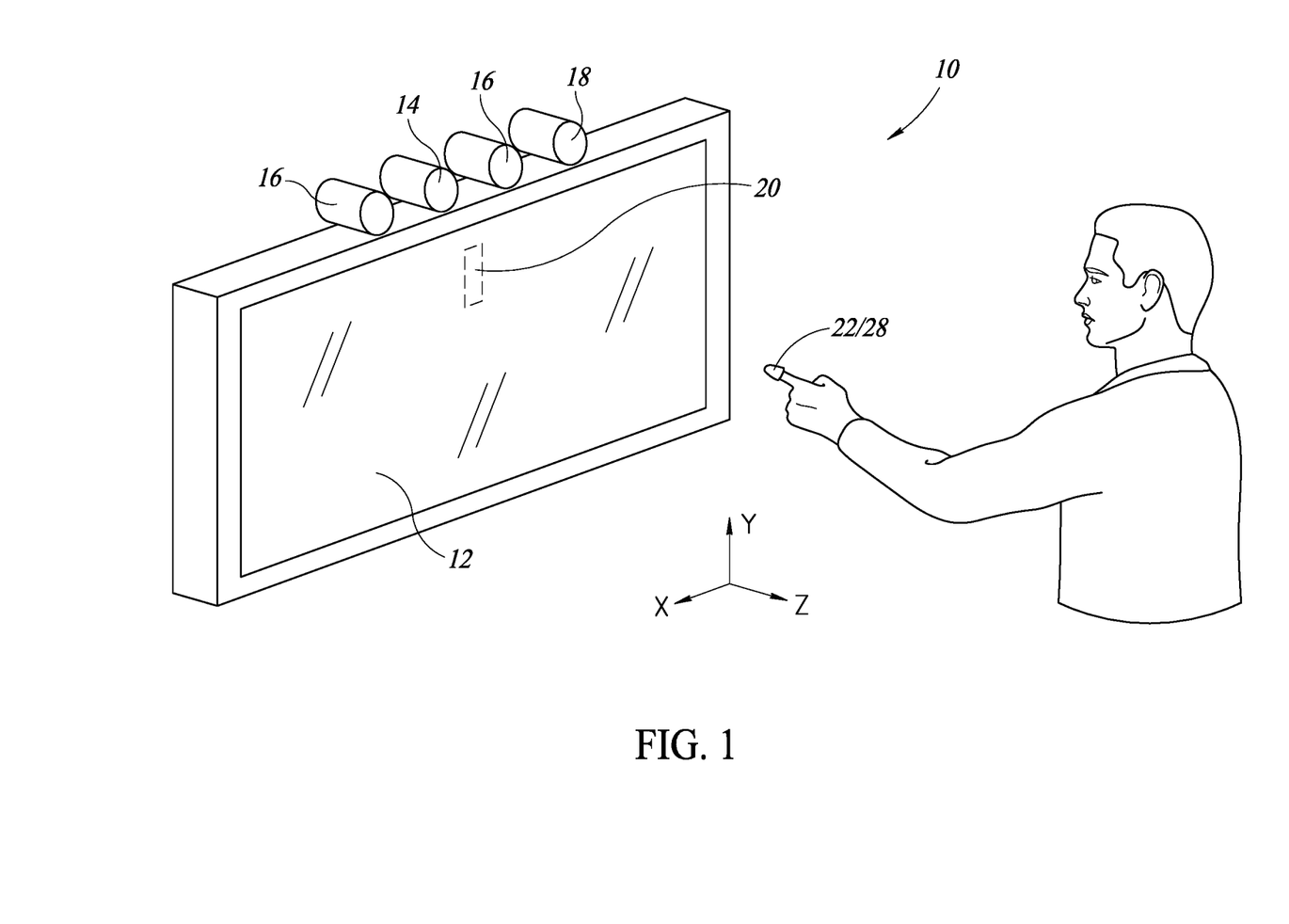
FIG. 1 is a system according to an embodiment disclosed herein.

FIG. 1 is a system 10 according to an embodiment disclosed herein. The system 10 is interactive display device that detects a position of a user and an optical emitter device, along three different dimensions. For example, as shown in FIG. 1, the system 10 detects a position of the user and the optical emitter device along an x-axis; a y-axis, which is transverse to the x-axis; and a z-axis, which is transverse to the x-axis and the y-axis. The system 10 then performs or alters an action on the display in response to detecting different motions by the user or the emitting device. The system 10 is suitable for a variety of different applications, such as a virtual whiteboard, a teleconferencing system, and a computer with three-dimensional user input capabilities.

The system 10 includes a display 12, a camera 14, an emitter 16, a depth sensor 18, and a processor 20.

The display 12 is a monitor configured to display various images. The display is in a plane extending along the x-axis and the y-axis. The display 12 may be a large, wall-mounted type of display, or a small, lightweight display part of a portable electronic device. The display 12 may also be included in a wearable device (e.g., a heads-up display (HUD), electronic glasses, etc.). In one embodiment, the display 12 is a touch-screen configured to detect a user's touch.

The camera 14 is attached to the display 12. The camera 14 captures images of a user, an emitter, or another object in front of the camera 14. The camera 14 may be any type of camera, such as a red-green-blue (RGB) webcam. Images captured by the camera 14 are, for example, reproduced on the display 12, saved into memory of the system 10, and transmitted to another system communicatively coupled to the system 10.

The emitter 16 emits a light signal from the emitter 16 and towards a user in a surrounding environment. In one embodiment, the light signal is in the infrared (IR) spectrum. In one embodiment, the emitter 16 is a vertical-cavity surface-emitting laser (VCSEL), and the light signal is a laser. The system 10 may include any number of emitters. For example, the system 10 includes two emitters 16 in the embodiment shown in FIG. 1. As will be discussed below, the emitter 16 works in conjunction with the depth sensor 18 to determine a depth or distance between the depth sensor 18 and a target object.

The depth sensor 18 determines a distance along the z-axis between the depth sensor 18 and a target object (e.g., the user or optical emitter device) in a surrounding environment. The depth sensor 18 may be, for example, a direct time-of-flight sensor, an indirect time-of-flight sensor, a three-dimensional camera (e.g., a stereo camera), or another type of depth sensor. The depth sensor 18 includes an image sensor and a processor.

The image sensor of the depth sensor 18 includes a plurality of photodetectors that sense or measure light. The image sensor may be any type of sensor that measures light signals, such as a single-photon avalanche diode (SPAD) array. In the embodiment where the emitter 16 emits IR light, the image sensor is covered with an optical filter that blocks light except for light in the IR spectrum. As a result, the image sensor receives and images IR light emitted by the emitter 16.

The processor of the depth sensor 18 processes the data detected by the image sensor to determine depth. The processor may be any type of processor, controller, or signal processor configured to process data. As an example case in which the depth sensor 18 is a time-of-flight sensor, the emitter 16 emits a light signal into a surrounding environment. The image sensor then receives and measures a reflection of the light signal that was reflected off the target object in the surrounding environment. The processor then determines the distance between the depth sensor 18 and the object based on the received reflected light signal. For example, the depth sensor 18 determines the time of flight of the light signal to travel from the emitter 16, to the target object, and back to the image sensor; and determines the distance based on the time of flight. As another example, the distance between the depth sensor 18 and the target object is determined based on the relative intensities of the light signal emitted by the emitter 16 and the reflected light signal detected by the image sensor. Other methods are also possible.

In one embodiment, the depth sensor 18 is a three-dimensional depth sensor that detects coordinates of the target object along the x-axis and y-axis, in addition to the z-axis. The depth sensor 18, for example, determines a position of the target object along the x-axis, y-axis, and the z-axis as the closest point detected by the depth sensor 18 and/or as a position of an object in the surrounding environment that is moving for a threshold amount of time.

In the case where the position of the target object is the closest point detected by the depth sensor 18, the depth sensor 18 determines a plurality of distances along the z-axis between the depth sensor 18 and various objects in the surrounding environment, and determines a z-coordinate of the target object as the depth of the closest object to the depth sensor 18 (e.g., the object having the smallest distance from the depth sensor 18, or the object having distance from the depth sensor 18 below a threshold value). The x-coordinate and the y-coordinate of the user is then determined as the x-coordinate and the y-coordinate of the closest object detected by the image sensor of the depth sensor 18, which is two-dimensional.

In the case where the position of the target object is an object in the surrounding environment that is moving, the depth sensor 18 determines a plurality of distances between the depth sensor 18 and various objects in the surrounding environment, and determines a z-coordinate of the target object as the depth of an object in which distances between the distance sensor and the moving object is continuously changing for a threshold amount of time. Similarly, the x-coordinate and the y-coordinate of the target object is determined as the x-coordinate and the y-coordinate of an object detected by the image sensor of the depth sensor 18 that is continuously changing for a threshold amount of time.

In FIG. 1, the camera 14, the emitter 16, and the depth sensor 18 are separate devices that are attached to an outer surface of the display 12. However, other configurations are possible. For example, the camera 14, the emitter 16, and the depth sensor 18 may be implemented in a single device. The camera 14, the emitter 16, and the depth sensor 18 may also be integrated within the display 12, itself. In addition, the emitter 16 and the depth sensor 18 may also be implemented as a single sensor.

The processor 20 is a general-purpose processing unit of the system 10. The processor 20 may be any type of processor, controller, or signal processor configured to process data. The processor 20 controls and executes various functions of the system 10. For example, the processor 20 executes the operating system of the system 10, controls various communication features of the system 10, and controls the various images displayed on the display 12. In addition, the processor 20 detects various motions of the user and optical emitter device based on positions of the user and optical emitter device, respectively, detected by the depth sensor 18; and performs or alters an action in response to detecting different motions. For example, the position (e.g., x-coordinate, y-coordinate, z-coordinate) of the user and optical emitter device is tracked, recorded, and displayed on the display 12 such that the user is able to draw virtually on the display 12. As another example, the position of the user and optical emitter device is transmitted to another system communicatively coupled to the system 10 to be displayed. Detection of the user and optical emitter device, and various actions taken based on the detection will be discussed in further detail below.

As discussed above, the emitter 16 emits a light signal into a surrounding environment, the depth sensor 18 receives and measures a reflection of the light signal that was reflected off an object in the surrounding environment, and the depth sensor 18 determines a distance between the depth sensor 18 and the object based on the received reflected light signal. In some cases, detection by the depth sensor 18 may have difficulty reliably detecting a user's finger due to its small size and proximity to other fingers. In order to improve detection of the user's finger, the user is provided with a passive device to be worn on the user's finger.

Figure 2:
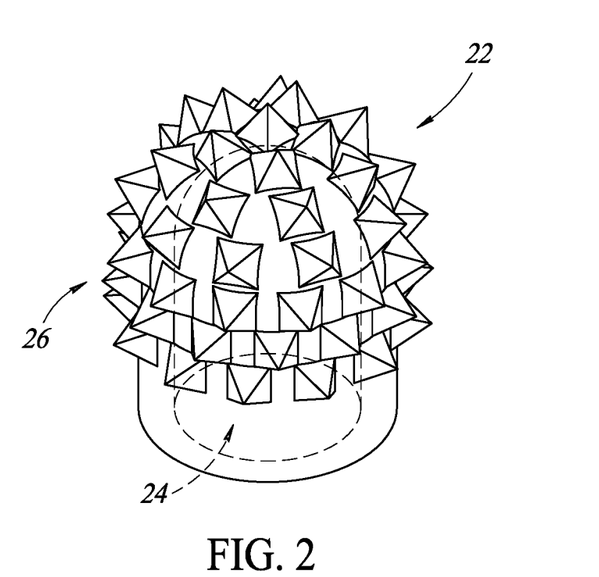
FIG. 2 is a passive device worn by a user according to an embodiment disclosed herein.

FIG. 2 is a passive device 22 worn by a user according to an embodiment disclosed herein. The passive device 22 is cylindrical, similar to a thimble, and is worn on a user's finger as shown in FIG. 1. Stated differently, a user's finger is inserted into the passive device 22. The passive device 22 includes a trench 24 and a plurality of angled surfaces 26.

The trench 24 extends into the passive device 22, and forms a small cup that may be placed onto the user's finger. When the passive device 22 is worn by the user, the user's finger is inserted into the trench 24.

The plurality of angled surfaces 26 form a plurality of edges and corners on an outer surface of the passive device 22. The angled surfaces 26 are angled relative to the outer surface of the passive device 22. In the embodiment shown in FIG. 2, the angled surfaces 26 are formed by a plurality of pyramid shaped objects on the outer surface of the passive device 22. Other shapes are also possible.

The angled surfaces 26 improve reflection of light signals that hit the passive device 22. As a result, the signal-to-noise ratio of reflected light signals received by the depth sensor 18 is improved, and the user's finger with the passive device 22 may be reliably detected. In one embodiment, the angled surfaces 26 are covered with or made of a reflective material to improve the reflectance of the passive device 22 even further.

Other shapes for the passive device 22 are also possible. For example, the passive device 22 may be a toroidal shape (e.g., a wearable ring) or a glove.

Figure 3:
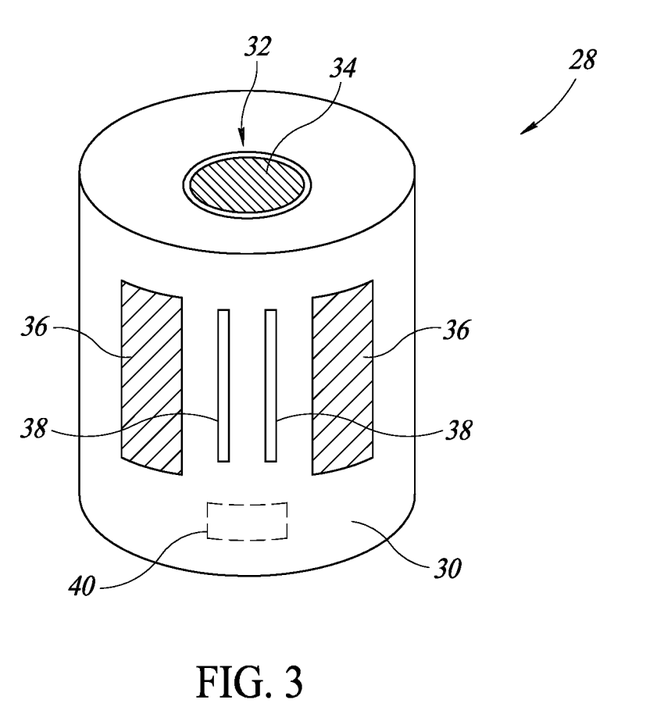
FIG. 3 is an optical emitter device according to an embodiment disclosed herein.

In another embodiment, instead of a user wearing the passive device 22, the user holds and moves an optical emitter device, and the system 10 tracks the optical emitter device. FIG. 3 is an optical emitter device 28 according to an embodiment disclosed herein. The optical emitter device 28 includes a housing 30, an emitter 32, an optical element 34, switches 36, inserts 38, and a sensor unit 40.

The housing 30 is a casing that holds the emitter 32, the optical element 34, the switches 36, the insert 38, and the sensor 40. In one embodiment, as shown in FIG. 3, the housing 30 has a cylindrical shape similar to a pen or laser pointer so that a user may easily hold and move the optical emitter device 28.

Figure 4:
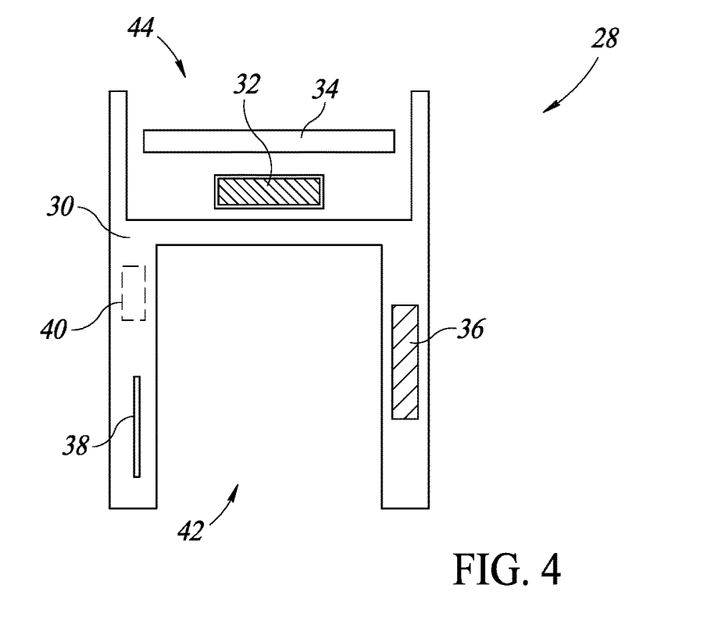
FIG. 4 is a cross sectional view of an optical emitter device according to another embodiment disclosed herein.

Other shapes are also possible, such as a toroidal shape (e.g., a wearable ring) and a shape similar to that of a television remote control. For example, FIG. 4 is a cross sectional view of the optical emitter device 28 according to another embodiment disclosed herein. In this embodiment, the optical emitter device 28, similar to the passive device 22 in FIG. 2, is cylindrical, similar to a thimble, and is worn on a user's finger as shown in FIG. 1. Stated differently, a user's finger is inserted into the optical emitter device 28. The optical emitter device 28 includes a first trench 42 on a backside of the optical emitter device 28; and a second trench 44 on a front side, opposite to the backside, of the optical emitter device 28.

The first trench 42 extends into the backside of the optical emitter device 28, and forms a small cup that may be placed onto the user's finger. When the optical emitter device 28 is worn by the user, the user's finger is inserted into the first trench 42.

The second trench 44 extends into the front side of the optical emitter device 28. The emitter 32 and the optical element 34 are positioned in the second trench 44.

Returning now to FIG. 3, the emitter 32 emits a light signal from the emitter 32. When in use, a user points the emitter 32 towards the depth sensor 18. In the embodiment where the depth sensor 18 detects IR light, the emitter 32 emits an IR signal having the same wavelength as the IR signal emitted by the emitter 16 and detected by the depth sensor 18. This allows light emitted by the optical emitter 28 to pass through the optical filter of the depth sensor 18, similar to the light emitted by the emitter 16. Further, light emitted by the emitter 32 will be blocked or go undetected by the camera 14. In one embodiment, the emitter 16 is a VCSEL.

The optical element 34 directly overlies the emitter 32. The optical element 34 alters or shapes light transmitted by the emitter 32. In one embodiment, the optical element 34 is a diffuser. For example, the optical element 34 includes a plurality of diffractive optical elements that increase the beam angle of the light transmitted from the emitter 32.

The switches 36 are configured to set or initiate various settings or motions for the optical emitter device 28. In one embodiment, each of the switches 36 has an on state in which the switch is in a first position, and an off state in which the switch is in a second position. The switches 36 may be a mechanical or electrical switch, toggle, button, etc. Although two switches are shown in FIG. 3, the optical emitter device 28 may include any number of switches. As will be discussed in further detail below, setting or position information (e.g., on or off states) of the switches 36 is encoded and transmitted to the system 10 through the emitter 32 using, for example, signal modulation techniques. Further, the setting information of the switches 36 is used in conjunction with other parameters to perform a plurality of actions.

The inserts 38 are receptacles configured to receive various peripherals of the optical emitter device 28. For example, one of the inserts 38 is configured to accept a power source, such as a battery, that supplies power to the optical emitter device 28. In one embodiment, the optical emitter device 28 includes energy harvesting technology (e.g., radio frequency, photovoltaic, thermal, motion power harvesting techniques) to recharge the power source. As another example, one of the inserts is configured to accept a memory device.

The sensor unit 40 includes one or more sensors. For example, the sensor unit 40 may include touch sensors, motion sensors (e.g., accelerometers, gyroscopes, etc.), light sensors, battery level sensors, temperature sensors, humidity sensors, optical sensor (e.g., optical finger navigation sensor), and various other types of sensors. As will be discussed in further detail below, sensor data generated by the sensor unit 40 is encoded and transmitted to the system 10 through the emitter 32 using, for example, signal modulation techniques.

The optical emitter device 28 is configured to transmit data directly to the system 10. The data may include identification information of the optical emitter device 28, settings or position information of the switches 36, and sensor data generated by the sensor unit 40. The data may be transmitted using various communications techniques, such as Wi-Fi, Bluetooth, etc. In one embodiment, data is transmitted by the emitter 32. For example, the optical emitter device 28 encodes data into a light signal transmitted by the emitter 32 using, for example, signal modulation techniques. The system 10 then receives and decodes the encoded light signal to obtain the data. The encoded light signal may be detected by the image sensor of the depth sensor 18 or another image sensor included in the system 10, and processed by the processor 20.

In order to determine the three-dimensional coordinates and motion of the optical emitter device 28 along the x-axis, y-axis, and the z-axis in FIG. 1, the system 10 alternates between a gesture mode and a ranging mode.

In the gesture mode, the emitter 16 of the system 10 is disabled and stops transmitting light signals. However, the emitter 32 of the optical emitter device 28 continues to emit light. As the emitter 16 is no longer emitting light into the surrounding environment, the system 10, more specifically the processor 20, determines the x-coordinate and the y-coordinate of the optical emitter device 28 as the x-coordinate and the y-coordinate, respectively, of the brightest object (e.g., object with a light intensity greater than a threshold value) detected by the image sensor of the depth sensor 18, which is two-dimensional. Stated differently, the processor 20 assumes the light received by the image sensor with the largest light intensity is emitted by the optical emitter device 28, and determines the x-coordinate and the y-coordinate based on the position of the light with the largest light intensity on the image sensor.

The system 10 repeatedly (e.g., periodically at a set interval) determines and records the x-coordinate and the y-coordinate of the optical emitter device 28 to determine motion of the optical emitter device 28 along the x-axis and y-axis, respectively. As will be discussed in further detail below, the determined motions along the x-axis and y-axis are used in conjunction with other parameters to perform a plurality of actions.

The x-coordinate and the y-coordinate may also be determined by the processor of the depth sensor 18 instead of the processor 20. In addition, the system 10 may also include another image sensor that is used instead of the image sensor of the depth sensor 18 to determine the x-coordinate and the y-coordinate of the optical emitter device 28 in the gesture mode.

Once an x-coordinate and a y-coordinate have been determined, the system 10, more specifically the processor 20, utilizes the x-coordinate and y-coordinate to determine and indicate a corresponding position in an image displayed on the display 12 (e.g., display a cursor). The system 10 also determines where the corresponding position is in relation to the entire image displayed on the display 12. For example, the system 10 determines whether the x-coordinate and y-coordinate is within a left portion, a right portion, an upper portion, or a lower portion of the image displayed on the display 12. As will be discussed in further detail below, the corresponding position in the image displayed on the display 12 is used in conjunction with other parameters to perform a plurality of actions.

In one embodiment, the light signal emitted by the emitter 32 of the optical emitter device 28 is modulated such that the emitter 32 appears to blink on and off. For example, the light signal emitted by the emitter 32 may be a square wave with a frequency that is less than half of the frame rate of the image sensor of the depth sensor 18. The blinking of the light assists with cancellation of ambient light, and allows the x-coordinate and the y-coordinate of the optical emitter device 28 to be accurately determined even in the presence of bright sunlight.

In the ranging mode, the emitter 16 of the system 10 is enabled, and both the emitter 16 of the system 10 and the emitter 32 of the optical emitter device 28 transmit light signals. Further, the depth sensor 18 operates as discussed above with respect to FIG. 1. Namely, the depth sensor 18 determines a distance along the z-axis between the depth sensor 18 and the optical emitter device 28. The distance along the z-axis is the z-coordinate of the optical emitter device 28.

In one embodiment, the z-coordinate is determined based on the x-coordinate and the y-coordinate of the optical emitter device 28 determined in the gesture mode. For example, the depth sensor 18 determines the z-coordinate as the distance between the depth sensor 18 and the object (i.e., the optical emitter device 28) at the x-coordinate and the y-coordinate of the optical emitter device 28.

The system 10 repeatedly (e.g., periodically at a set interval) determines and records the z-coordinate of the optical emitter device 28 to determine motion of the optical emitter device 28 along the z-axis.

Once a z-coordinate has been determined, the system 10, more specifically the processor 20, utilizes the z-coordinate to determine and indicate a corresponding position in an image displayed on the display (e.g., display a cursor).

In one embodiment, in the ranging mode, the light signal emitted by the emitter 32 of the optical emitter device 28 includes identification information so that the depth sensor 18 is able to distinguish between the light signal emitted by the emitter 32 and the light signal that was reflected off the optical emitter device 28. For example, the optical emitter device 28 encodes identification information into the light signal transmitted by the emitter 32 using, for example, signal modulation techniques. The system 10, more specifically the processor 20, then receives and decodes the encoded light signal to obtain the identification information.

Figure 5:
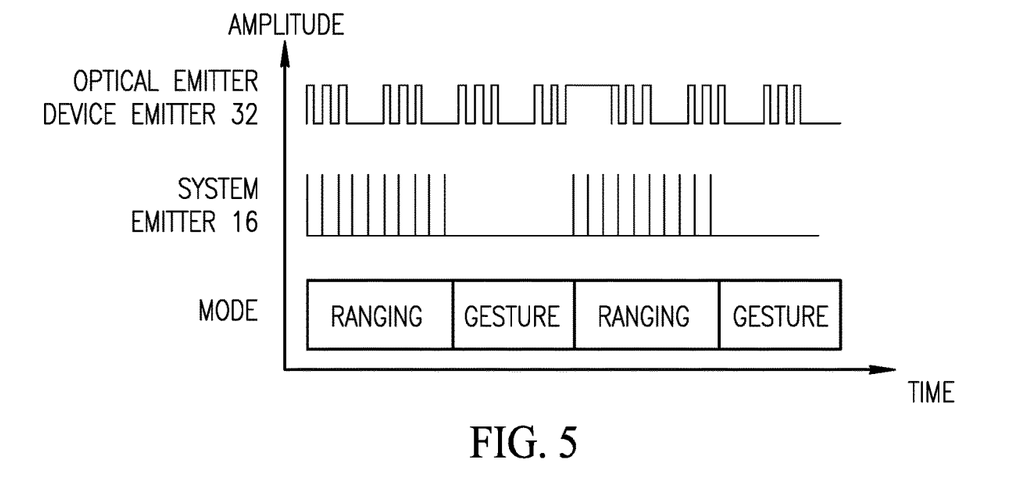
FIG. 5 is a diagram of a ranging mode and a gesture mode according to an embodiment disclosed herein.

FIG. 5 is a diagram of the ranging mode and the gesture mode according to an embodiment disclosed herein. The horizontal axis is a time axis, and the vertical axis is an amplitude axis. The time axis may have any type of time unit (e.g., milliseconds, seconds, etc.), and the vertical axis may have any type of light intensity unit (e.g., candela, lumens, etc.).

As shown in FIG. 5, the mode of the system 10 alternates between the ranging mode and the gesture mode. When the depth sensor 18 is in the ranging mode, the emitter 16 of the system 10 is enabled, and both the emitter 16 of the system 10 and the emitter 32 of the optical emitter device 28 transmit light signals. Conversely, when the depth sensor 18 is in the gesture mode, the emitter 32 of the optical emitter device 28 continues to emit light. However, the emitter 16 of the system 10 is disabled and stops transmitting light signals.

In a case where a plurality of optical emitter devices 28 are used in conjunction with the system 10, the system 10 is configured to identify or distinguish between the optical emitter devices 28. For example, as discussed above, the optical emitter device 28 may transmit identification information directly to the system 10.

Alternatively, each of the optical emitter devices 28 are configured to emit light with a unique beam or cone angle. Stated differently, each of the optical emitter devices 28 emits light having a beam angle that is different from the beam angles of light emitted by the remaining optical emitter devices 28. The different beam angles are configured for the optical emitter devices 28 by, for example, utilizing different optical elements 34 for the optical emitter devices 28. For example, each of the optical elements 34 are different diffusers.

In this embodiment, the system 10 stores known beam angles of the optical emitter devices 28 in correspondence to each other. Upon receiving a light signal from an optical emitter device, the system 10 (e.g., the processor 20) determines the beam angle of the light signal, and identifies the optical emitter device based on the determined beam angle. For example, the system 10 uses a look up table to determine which of the stored known beam angles is closest to the determined beam angle, and determines the light signal is emitted by the optical emitter device having the beam angle closest to the determined beam angle.

The beam angles of light emitted by the optical emitter devices 28 are proportional to a size of the light (e.g., a diameter, a centroid, or a full width at half maximum of the light) detected by an image sensor of the system 10 (e.g., the image sensor of the depth sensor 18) and a depth of the optical emitter device (e.g., the z-coordinate of the optical emitter device). For example, see equation (1) below.

$$\tan\left(\frac{\text{Beam Angle}}{2}\right) \propto \frac{\text{Size}}{\text{Depth}} \quad (1)$$

As such, the system 10 is able to determine a beam angle of light emitted by an optical emitter device 28 based on the size of light detected by the image sensor of the system 10 and a depth of the optical emitter device 28. For instance, the system 10 (e.g., the processor 20) determines the size of light detected by an image sensor of the system 10 and a depth of the optical emitter device emitting the light, determines a beam angle of the optical emitter device based on the size and depth, and identifies the optical emitter device based on the beam angle as discussed above.

As an example, in a case where the system 10 detects three different spots of light having the same size, the system 10 is able to identify the optical emitter device having the smallest spot size as the optical emitter device having the smallest depth (e.g., the optical emitter device closest to the system 10).

Instead of utilizing beam angles to distinguish between optical emitter devices 28, each of the optical emitter devices 28 may also be configured to emit light with a unique pattern (e.g., an arrow, a line, an "L" shape, a circular shape, etc.). Stated differently, each of the optical emitter devices 28 emits light having a pattern that is different from the patterns of light emitted by the remaining optical emitter devices 28. Different light patterns are configured for the optical emitter devices 28 by utilizing different optical elements 34 for the optical emitter devices 28. For example, each of the optical elements 34 are fabricated with different diffractive optical elements to reshape light into different patterns.

In this embodiment, the system 10 stores known patterns of the optical emitter devices 28 in correspondence to each other. Upon receiving a light signal from an optical emitter device, the system 10 (e.g., the processor 20) determines the pattern of the light signal, and identifies the optical emitter device based on the determined pattern. For example, the system 10 uses a look up table to determine which of the stored known patterns is closest to the determined pattern, and determines the light signal is emitted by the optical emitter device having the pattern closest to the determined pattern.

Figure 6:
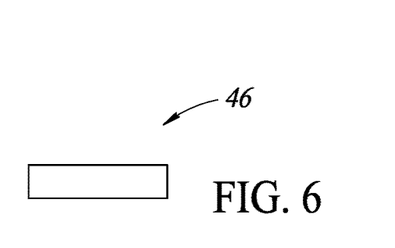
FIG. 6 is a line light pattern according to an embodiment disclosed herein.
Figure 7:
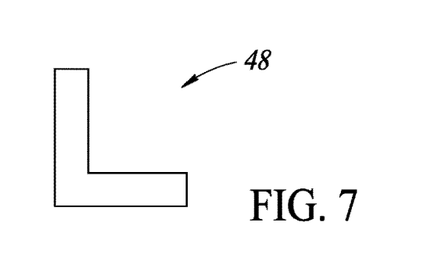
FIG. 7 is an "L" light pattern according to an embodiment disclosed herein.

FIGS. 6 and 7 show example light patterns that may be emitted by one or more optical emitter devices 28. FIG. 6 is a line light pattern 46 according to an embodiment disclosed herein. The line light pattern 46 extends in a single direction. FIG. 7 is an "L" light pattern 48 according to an embodiment disclosed herein. The "L" light pattern 48 includes a first portion that extends in a first direction, and second portion that extends in a second direction transverse to the first portion.

By implementing the optical emitter devices 28 with light patterns besides a spot or circular pattern, the system 10 (e.g., the processor 20) may also detect clockwise or counter clockwise rotation by the optical emitter device 28. For example, the system 10 may detect a rotation of an optical emitter device 28 in response to detecting that the light pattern, such as the line light pattern 46 and the "L" light pattern 48, is rotating. The light pattern may be detected by the image sensor of the depth sensor 18 or another image sensor included in the system 10. The detected rotation may then be used to set or initiate various settings or motions for the optical emitter device 28 (e.g., changing of a color, a size of a pointer, volume, etc.). As will be discussed in further detail below, the rotation (e.g., clockwise, or counter clockwise) by the optical emitter device 28 is used in conjunction with other parameters to perform a plurality of actions.

As discussed above, the system 10 is able to detect various parameters of the optical emitter device 28. For example, the system 10 is able to determine motion of the optical emitter device 28 along the x-axis, y-axis, and z-axis; a corresponding position of the optical emitter device 28 in relation to the entire image displayed on the display 12 (e.g., a left portion, a right portion, an upper portion, or a lower portion of the image displayed on the display 12); setting information of the switches 36 (e.g., on or off state); and rotation by the optical emitter device 28 (e.g., clockwise or counter clockwise rotation). The various parameters are used in conjunction with each other to perform a plurality of different actions by the system 10. For example, the table below shows various actions that are performed by the system 10 in response to detecting certain combinations of parameters. Each action is performed in response to detecting the indicated parameters in the same row as the action in the table below. The axes refer to the axes shown in FIG. 1. "Ignored" in the table below means that the rotation is not taken into consideration for the particular action.

| Motion | Position on Display | Switch #1 | Switch #2 | Rotation | Action |
| --- | --- | --- | --- | --- | --- |
| Along X-Axis | Anywhere | Off | Off | Ignored | Draw Horizontal |
| Along Y-Axis | Anywhere | Off | Off | Ignored | Draw Vertical |
| Towards System Along Z-Axis | Left Side | Off | Off | Ignored | Increase Zoom |

-continued

| Motion | Position on Display | Switch #1 | Switch #2 | Rotation | Action |
|---|---|---|---|---|---|
| Away from System Along Z-Axis | Left Side | Off | Off | Ignored | Decrease Zoom |
| Towards System Along Z-Axis | Right Side | Off | Off | Ignored | Next/Forward |
| Away from System Along Z-Axis | Right Side | Off | Off | Ignored | Previous/Back |
| Along X-Axis | Anywhere | On | Off | Ignored | Adjust Yaw |
| Along Y-Axis | Anywhere | On | Off | Ignored | Adjust Roll |
| Along Y-Axis | Anywhere | On | Off | Ignored | Adjust Pitch |
| Along Y-Axis | Anywhere | Off | On | Ignored | Pan Vertical |
| Towards System Along Z-Axis | Anywhere | Off | On | Ignored | Fine Increase Zoom |
| Away from System Along Z-Axis | Anywhere | Off | On | Ignored | Fine Decrease Zoom |
| Clockwise | Anywhere | Off | Off | Ignored | Erase |
| Counter Clockwise | Anywhere | Off | Off | Ignored | Fine Erase |
| Stationary | Anywhere | Off | Off | Clockwise | Increase Brightness |
| Stationary | Anywhere | Off | Off | Counter Clockwise | Decrease Brightness |
| Stationary | Anywhere | On | Off | Clockwise | Increase Color Hue |
| Stationary | Anywhere | On | Off | Counter Clockwise | Decrease Color Hue |
| Stationary | Anywhere | Off | On | Clockwise | Increase Color Saturation |
| Stationary | Anywhere | Off | On | Counter Clockwise | Decrease Color Saturation |

In a case where a plurality of optical emitter devices 28 are used in conjunction with the system 10, increased functionality is possible by identifying the optical emitter devices 28 and utilizing the various parameters from each of the optical emitter devices 28. The various parameters of each of the optical emitter devices 28 are used in conjunction with each other to perform a plurality of different actions by the system 10. For example, the table below shows various actions that are performed by the system 10 in response to detecting certain combinations of parameters of two optical emitter devices 28 (optical emitter device #1 and #2). Each action is performed in response to detecting the indicated parameters in the same row as the action in the table below. The axes refer to the axes shown in FIG. 1. "Ignored" in the table below means that the motion or rotation of the respective optical emitter device is not taken into consideration for the particular action.

| Motion of Optical Emitter Device #1 | Motion of Optical Emitter Device #2 | Switch of Optical Emitter Device #1 or #2 | Rotation of Optical Emitter Device #1 | Rotation of Optical Emitter Device #2 | Action |
|---|---|---|---|---|---|
| Towards System Along Z-Axis | Ignored | Off | Ignored | Ignored | Set Selection to a First Corner of Display |
| Ignored | Towards System Along Z-Axis | Off | Ignored | Ignored | Set Selection to a Second Corner of Display |
| Towards System Along Z-Axis | Away from System Along Z-Axis | Off | Ignored | Ignored | Rotate Cursor −90° |
| Away from System Along Z-Axis | Towards System Along Z-Axis | Off | Ignored | Ignored | Rotate Cursor +90° |
| Towards Optical Emitter Device #2 | Towards Optical Emitter Device #1 | Off | Ignored | Ignored | Increase Zoom |
| Away from Optical Emitter Device #1 | Away from Optical Emitter Device #2 | Off | Ignored | Ignored | Decrease Zoom |
| Away from System Along Z-Axis | Ignored | On | Ignored | Ignored | Crop to a First Corner of Display |
| Ignored | Away from System Along Z-Axis | On | Ignored | Ignored | Crop to a Second Corner of Display |

-continued

| Motion of Optical Emitter Device #1 | Motion of Optical Emitter Device #2 | Switch of Optical Emitter Device #1 or #2 | Rotation of Optical Emitter Device #1 | Rotation of Optical Emitter Device #2 | Action |
|---|---|---|---|---|---|
| Stationary | Stationary | On | Counter Clockwise | Clockwise | Exit Application |
| Upward, Downward, and Upward Sequentially Along Y-Axis | Upward, Downward, and Upward Sequentially Along Y-Axis | Off | Ignored | Ignored | Shutdown System |

The various embodiments disclosed herein provide a three-dimensional interactive display system. The system detects a position of a user (e.g., the user's finger or hand) or an optical emitter device, along three different dimensions. In one embodiment, the user wears a passive device having angled surfaces on his or her finger to improve detection of the user's finger. In one embodiment, the user holds the optical emitter device or wears the optical emitter device similar to the passive device. The optical emitter device emits light, and the system tracks the optical emitting device by detecting the light emitted by the optical emitter device.

A system, may be summarized as including a passive device configured to be worn by a user, the passive device having a plurality of angled surfaces; an emitter configured to emit a light signal towards the passive device; a depth sensor configured to receive a reflected light signal that is the light signal reflected from at least one of the plurality of angled surfaces, and determine a position of the passive device based on the reflected light signal; and a display configured to display the position of the passive device.

The passive device may be configured to be worn on the user's finger.

The passive device may include a trench, and the plurality of angled surfaces may be on an outer surface of the passive device.

The depth sensor may be configured to determine first, second, and third coordinates of the passive device along first, second, and third axes, respectively.

The depth sensor may be configured to determine distances between a plurality of objects and the depth sensor, determine an object of the plurality of objects that has the smallest distance of the distances, and determine the position of the passive device as a position of the object.

The depth sensor may be configured to determine an object is moving for a threshold amount of time, and determine the position of the passive device as a position of the object.

The depth sensor may include the emitter.

A system may be summarized as including an optical emitter device including: a housing; a first emitter in the housing and configured to emit a first light signal; a second emitter configured to emit a second light signal; a sensor including: an image sensor configured to receive the first light signal, and a reflected light signal that is the second light signal reflected from the optical emitter device; and a processor configured to: determine first and second coordinates of a position of the optical emitter device along first and second axes, respectively, based on the first light signal received by the image sensor; and determine a third coordinate of the position of the optical emitter device along a third axis based on the reflected light signal; and a display configured to display the position of the optical emitter device, the display being in a plane extending along the first and second axes.

The system may be configured to alternate between a first mode and a second mode, in the first mode, the first emitter emits the first light signal, and the second emitter does not emit the second light signal, and in the second mode, the first emitter and second emitter emit the first light signal and the second light signal, respectively.

The processor may determine the first and second coordinates in the first mode, and may determine the third coordinate in the second mode.

The processor may be configured to determine a light intensity of an object detected by the image sensor is greater than a threshold value, and determine the first and second coordinates based on a position of the object.

The processor may be configured to determine the third coordinate based on the first and second coordinates.

The optical emitter device may be configured to be worn on a user's finger.

The optical emitter device may include an optical element in the housing, the first emitter may emit the first light signal through the optical element, and the optical element may be configured to shape the first light signal to have a light pattern.

The light pattern may include a single portion extending in a single direction.

The light pattern may have a first portion extending in a first direction, and a second portion extending in a second direction transverse to the first direction.

The optical emitter device may include a plurality of switches.

The system may further include another processor configured to perform an action based on the position of the optical emitter device and states of the plurality of switches.

A method may be summarized as including setting a display device to a first mode, the setting of the display device to the first mode including: emitting, by an optical emitter device, a first light signal; receiving, by the display device, the first light signal; and determining, by the display device, first and second coordinates of a position of the optical emitter device along first and second axes, respectively, based on the first light signal received by the display device; setting the display device to a second mode, the setting of the display device to the second mode including: emitting, by the display device, a second light signal; receiving, by the display device, a reflected light signal that is the second light signal reflected from the optical emitter device; and determining, by the display device, a third coordinate of the position of the optical emitter device along a third axis based on the reflected light signal; and displaying, by the display device, the position of the optical emitter device, the display being in a plane extending along the first and second axes.

The setting of the first mode may include stopping emission of the second light signal.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A system, comprising:
a passive device configured to be worn by a user, the passive device having a plurality of angled surfaces;
an emitter configured to emit a light signal towards the passive device;
a depth sensor configured to:
receive a reflected light signal that is the light signal reflected from at least one of the plurality of angled surfaces, and determine a position of the passive device based on the reflected light signal; and
determine distances between a plurality of objects and the depth sensor, determine an object of the plurality of objects that has the smallest distance of the distances, and determine the position of the passive device as a position of the object; and
a display configured to display the position of the passive device.

2. The system of claim 1 wherein the passive device is configured to be worn on the user's finger.

3. The system of claim 2 wherein the passive device includes a trench, and the plurality of angled surfaces are on an outer surface of the passive device.

4. The system of claim 1 wherein the depth sensor is configured to determine first, second, and third coordinates of the passive device along first, second, and third axes, respectively.

5. The system of claim 1 wherein the depth sensor is configured to determine an object is moving for a threshold amount of time, and determine the position of the passive device as a position of the object.

6. The system of claim 1 wherein the depth sensor includes the emitter.

7. A system, comprising:
a first emitter configured to emit a first light signal;
an optical emitter device including a second emitter configured to emit a second light signal;
an image sensor configured to receive the second light signal emitted by the second emitter, and a reflected light signal that is the first light signal reflected off of the optical emitter device; and
a processor configured to:
determine first and second coordinates of a position of the optical emitter device along first and second axes, respectively, based on the second light signal emitted by the second emitter and received by the image sensor; and
determine a third coordinate of the position of the optical emitter device along a third axis based on the reflected light signal; and
a display configured to display the position of the optical emitter device, the display being in a plane extending along the first and second axes.

8. The system of claim 7 wherein
the system is configured to alternate between a first mode and a second mode,
in the first mode, the first emitter does not emit the first light signal, and the second emitter emits the second light signal, and
in the second mode, the first emitter and the second emitter emit the first light signal and the second light signal, respectively.

9. The system of claim 8 wherein the processor determines the first and second coordinates in the first mode, and determines the third coordinate in the second mode.

10. The system of claim 8 wherein the processor is configured to determine a light intensity of an object detected by the image sensor is greater than a threshold value, and determine the first and second coordinates based on a position of the object.

11. The system of claim 8 wherein the processor is configured to determine the third coordinate based on the first and second coordinates.

12. The system of claim 7 wherein the optical emitter device is configured to be worn on a user's finger.

13. The system of claim 7 wherein
the optical emitter device includes an optical element in a housing,
the second emitter emits the second light signal through the optical element, and
the optical element is configured to shape the second light signal to have a light pattern.

14. The system of claim 13 wherein the light pattern includes a single portion extending in a single direction.

15. The system of claim 13 wherein the light pattern has a first portion extending in a first direction, and a second portion extending in a second direction transverse to the first direction.

16. The system of claim 7 wherein the optical emitter device includes a plurality of switches.

17. The system of claim 16, further comprising:
another processor configured to perform an action based on the position of the optical emitter device and states of the plurality of switches.

18. A method, comprising:
setting a display device to a first mode, the setting of the display device to the first mode including:
receiving, by the display device, a first light signal emitted by an optical emitter device;
stopping, by the display device, emission of a second light signal; and
determining, by the display device, first and second coordinates of a position of the optical emitter device along first and second axes, respectively, based on the first light signal received by the display device;
setting the display device to a second mode, the setting of the display device to the second mode including:
emitting, by the display device, the second light signal;
receiving, by the display device, a reflected light signal that is the second light signal reflected from the optical emitter device; and
determining, by the display device, a third coordinate of the position of the optical emitter device along a third axis based on the reflected light signal; and
displaying, by the display device, the position of the optical emitter device, the display being in a plane extending along the first and second axes.

19. A system, comprising:
a first emitter configured to emit a first light signal;
an image sensor configured to receive a second light signal emitted by a second emitter included in an optical emitter device, and a reflected light signal that is the first light signal reflected off of the optical emitter device; and
a processor configured to:
  determine first and second coordinates of a position of the optical emitter device along first and second axes, respectively, based on the second light signal received by the image sensor; and
  determine a third coordinate of the position of the optical emitter device along a third axis based on the reflected light signal; and
a display configured to display the position of the optical emitter device, the display being in a plane extending along the first and second axes, wherein
the system is configured to alternate between a first mode and a second mode,
in the first mode, the first emitter does not emit the first light signal, and the second emitter emits the second light signal, and
in the second mode, the first emitter and the second emitter emit the first light signal and the second light signal, respectively.

20. A system, comprising:
a first emitter configured to emit a first light signal;
an image sensor configured to receive a second light signal emitted by a second emitter included in an optical emitter device, and a reflected light signal that is the first light signal reflected off of the optical emitter device,
  the optical emitter device including an optical element in a housing, the second emitter emits the second light signal through the optical element, the optical element configured to shape the second light signal to have a light pattern; and
a processor configured to:
  determine first and second coordinates of a position of the optical emitter device along first and second axes, respectively, based on the second light signal received by the image sensor; and
  determine a third coordinate of the position of the optical emitter device along a third axis based on the reflected light signal; and
a display configured to display the position of the optical emitter device, the display being in a plane extending along the first and second axes.

21. A system, comprising:
a first emitter configured to emit a first light signal;
an image sensor configured to receive a second light signal emitted by a second emitter included in an optical emitter device having a plurality of switches, and a reflected light signal that is the first light signal reflected off of the optical emitter device; and
a processor configured to:
  determine first and second coordinates of a position of the optical emitter device along first and second axes, respectively, based on the second light signal received by the image sensor; and
  determine a third coordinate of the position of the optical emitter device along a third axis based on the reflected light signal; and
a display configured to display the position of the optical emitter device, the display being in a plane extending along the first and second axes.

\* \* \* \* \*